(12) United States Patent
Cadoret et al.

(10) Patent No.: US 9,089,144 B2
(45) Date of Patent: Jul. 28, 2015

(54) HEAT TREATMENT VESSEL

(75) Inventors: Bernard Cadoret, Parc d'Activites de Broceliade (FR); Oliver Marquet, Parc d'Activites de Broceliade (FR)

(73) Assignee: ARMOR INOX, Mauron (FR)

( * ) Notice: Subject to any disclaimer, the term of this patent is extended or adjusted under 35 U.S.C. 154(b) by 1423 days.

(21) Appl. No.: 12/459,687

(22) Filed: Jul. 7, 2009

(65) Prior Publication Data
US 2010/0005974 A1    Jan. 14, 2010

(30) Foreign Application Priority Data
Jul. 9, 2008   (FR) ...................... 08 54666

(51) Int. Cl.
| | |
|---|---|
| *A47J 37/08* | (2006.01) |
| *A21B 1/48* | (2006.01) |
| *A23L 3/18* | (2006.01) |
| *A47J 37/04* | (2006.01) |
| *A22C 17/00* | (2006.01) |
| *A23L 3/00* | (2006.01) |

(52) U.S. Cl.
CPC ............. *A22C 17/00* (2013.01); *A23L 3/001* (2013.01); *A21B 1/48* (2013.01); *A47J 37/0857* (2013.01)

(58) Field of Classification Search
CPC . A47J 37/044; A47J 37/0814; A47J 37/0857; A47J 37/1219; A47J 37/1214; A21B 1/48; A23B 4/052; A23N 15/08
USPC ....... 99/355, 334, 386, 443 C, 477, 516, 404, 99/407
See application file for complete search history.

(56) References Cited

U.S. PATENT DOCUMENTS

| | | | | |
|---|---|---|---|---|
| 1,919,185 | A | * | 7/1933 | Chapman ........................ 99/404 |
| 2,150,273 | A | * | 3/1939 | Ferry .............................. 99/405 |
| 2,383,268 | A | * | 8/1945 | Morgan .......................... 99/640 |
| 2,543,643 | A | * | 2/1951 | Ryan et al. .................... 312/218 |
| 3,674,504 | A |   | 7/1972 | Lane |
| 3,947,241 | A | * | 3/1976 | Caridis et al. ................. 432/121 |
| 3,996,847 | A | * | 12/1976 | Reed ............................... 99/419 |
| 4,167,585 | A | * | 9/1979 | Caridis et al. ................. 426/233 |
| 4,453,457 | A |   | 6/1984 | Gongwer et al. |
| 4,644,857 | A | * | 2/1987 | Buller-Colthurst ............ 99/335 |
| 4,685,386 | A | * | 8/1987 | Bezon ............................. 99/404 |
| 4,887,524 | A | * | 12/1989 | Ellis-Brown ................ 99/443 C |
| 4,979,435 | A | * | 12/1990 | Hayashi et al. ................. 99/334 |
| 4,996,916 | A | * | 3/1991 | Miyawaki et al. .............. 99/453 |
| 5,044,267 | A | * | 9/1991 | Sollich ............................ 99/483 |
| 5,072,663 | A | * | 12/1991 | Ellis-Brown .................... 99/331 |
| 5,143,199 | A | * | 9/1992 | Evans ......................... 198/418.1 |
| 5,228,382 | A | * | 7/1993 | Hayashi et al. ................. 99/328 |
| 5,860,356 | A | * | 1/1999 | Kageyama ...................... 99/330 |
| 5,888,572 | A | * | 3/1999 | Gics et al. ..................... 426/496 |
| 6,009,798 | A | * | 1/2000 | Ledet et al. ................. 99/443 C |
| 6,467,401 | B2 | * | 10/2002 | Caridis et al. .................. 99/353 |
| 6,528,103 | B2 | * | 3/2003 | Pegoraro et al. ............. 426/233 |

(Continued)

OTHER PUBLICATIONS

Search Report for Application No. FR 0854666, 6 pages.

*Primary Examiner* — Dana Ross
*Assistant Examiner* — Hemant Mathew
(74) *Attorney, Agent, or Firm* — Faegre Baker Daniels LLP

(57) ABSTRACT

A heat treatment vessel configured to receive at least two stacks of food products, includes a chamber with an inlet opening and a discharge opening separated from the inlet opening. The vessel also includes a movement device configured to engage a stack received through the inlet opening and to transport it toward the discharge opening.

12 Claims, 5 Drawing Sheets

(56) References Cited

U.S. PATENT DOCUMENTS

| | | | |
|---|---|---|---|
| 6,644,174 B2 * | 11/2003 | Sakurazawa | 99/330 |
| 7,340,992 B1 * | 3/2008 | Wolfe et al. | 99/386 |
| 2004/0159245 A1 * | 8/2004 | Ledet et al. | 99/417 |
| 2006/0196234 A1 * | 9/2006 | Dolev | 70/56 |
| 2007/0267155 A1 * | 11/2007 | Howe et al. | 160/232 |
| 2009/0085447 A1 * | 4/2009 | McLuckie et al. | 312/234.1 |

\* cited by examiner

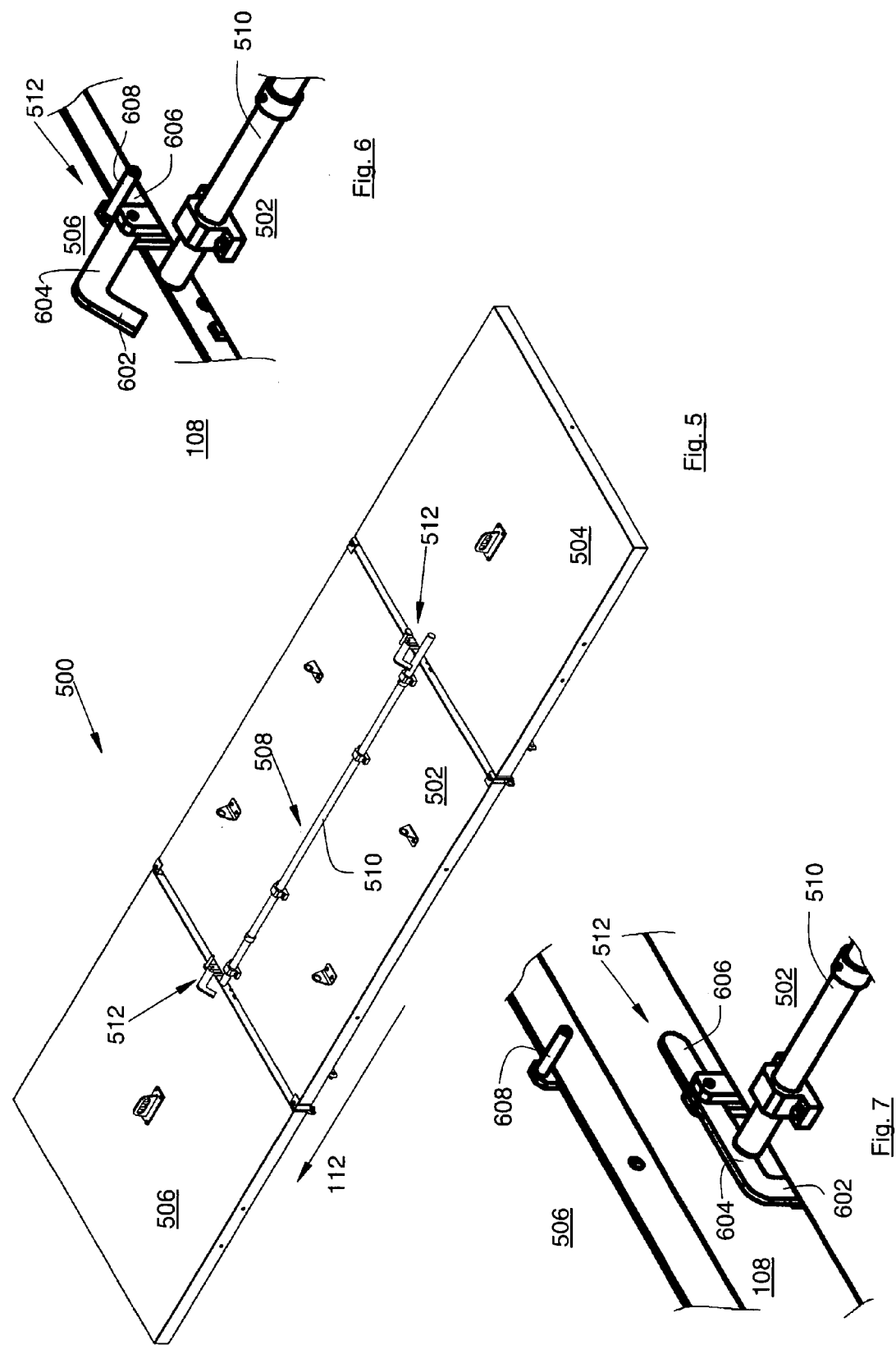

HEAT TREATMENT VESSEL

RELATED APPLICATIONS

The present application claims priority to French patent application Ser. No. 08/54666, titled "Heat Treatment Vessel," filed on Jul. 9, 2008, the entire disclosure of which is hereby expressly incorporated herein by reference.

FIELD OF THE INVENTION

The present invention concerns a heat treatment vessel for food products. It finds application in the field of the industrial processing of food products, of the type consisting of rolls of cooked meat. The invention also concerns a method of filling such a vessel and a cover device for such a vessel.

BACKGROUND

In order to prepare rolls of cooked meat such as for example joints of ham, these are disposed before cooking in alveoli in trays that are stacked or on staged frames. A heat treatment vessel of the prior art consists of a hermetic chamber provided with a cover. An example of a method of preparing rolls of food products is as follows:
 the cover of the empty vessel is opened,
 a stack of trays or a staged frame filled with rolls of raw food products is deposited in the vessel,
 the cover of the vessel is closed,
 the vessel is filled with hot water until the end of cooking,
 the vessel is emptied,
 the vessel is filled with cold water until the end of cooling,
 the vessel is emptied,
 the cover is opened,
 the stack of trays or the staged frame is removed from the vessel and transferred to the food product discharge area.

Such a heat treatment vessel can through its configuration pose certain problems with respect to local health standards since the food products enter and leave the vessel through the same opening.

SUMMARY OF THE DISCLOSURE

The present disclosure proposes a heat treatment vessel using water for performing the heat treatment and that avoids the entry and exit of the food products through the same opening. For this purpose, there is proposed a heat treatment vessel intended to receive at least two stacks of food products, the heat treatment vessel comprising:
 a chamber intended to be filled with water performing the heat treatment and comprising an inlet opening and a discharge opening that are distinct and distant from each other, and
 a movement device intended to take charge of a stack at the inlet opening and to transport it opposite the discharge opening.

In one embodiment, the inlet opening and the discharge opening are disposed on top of the chamber.

In one embodiment, the movement between the taking charge of the stack and its positioning opposite the discharge opening is a horizontal translation.

In one embodiment, the heat treatment vessel comprises a covering device comprising:
 a central element disposed on the part of the chamber that lies between the two openings,
 an inlet cover intended to close the inlet opening,
 a discharge cover intended to close the discharge opening, and
 a locking device that, in the closed position, alternately locks each of the said covers.

In one embodiment, the locking device comprises:
 a locking bar mounted so as to be free in translation on the central element parallel to the horizontal direction, each end of the said locking bar constituting a bolt able to cooperate with one of the covers in order to lock it in the closed position, and
 for each cover, a locking device intended to adopt a locking position in which the movement of the locking bar is prevented, and an unlocking position in which the movement of the locking bar is enabled.

In one embodiment, each locking device comprises a latch mounted so as to be free to rotate, the said latch comprising a locking lever that extends on one side of the rotation axis and an activation lever that extends on the other side of the rotation axis, and each cover comprises a stud intended to come, in the unlocking position, in abutment on the corresponding activation lever.

In one embodiment, the movement device comprises:
 a motorised assembly intended to generate a reciprocating movement, and
 a set of carriages, each being intended to successively receive a stack, and being set in motion by the said motorised assembly and comprising driving means that are locked to successively drive each stack from the inlet opening to the discharge opening and unlocking in order to avoid driving each stack from the discharge opening to the inlet opening.

In one embodiment, each driving means takes the form of a lug free to turn in one rotation direction and rotationally locked in the opposite direction.

In one embodiment, each carriage is mounted so as to slide in guide rails secured to the chamber.

In one embodiment, each stack rests on the bottom of the chamber by means of wheels.

The present disclosure also proposes a method of filling a heat treatment vessel with at least two stacks of food products, the heat treatment vessel comprising a chamber filled with water performing the heat treatment and comprising an inlet opening and a discharge opening, and a movement device, the method comprising:
 a step of admitting a first stack through the inlet opening,
 a step of transportation, by the movement device, of each stack already admitted in the direction of the position opposite the discharge opening,
 a step of admitting another stack through the inlet opening,
 a step of looping back on the transportation step as long as the first stack has not reached the position opposite the discharge opening.

In one embodiment, each admission step consists of depositing the stack vertically in line with a carriage of the movement device.

In one embodiment, the transportation step consists of a first movement of the carriage in the direction of the position opposite the discharge opening, and then a second movement in the opposite direction.

The present disclosure also proposes a covering device for a heat treatment vessel intended to receive at least two stacks of food products, the heat treatment vessel comprising:
 a chamber intended to be filled with water performing the heat treatment and comprising an inlet opening and a discharge opening distinct and distant from each other, and disposed on top of the chamber, and a movement device intended to take charge of a stack at the inlet opening and to transport it in a horizontal translation opposite the discharge opening, the covering device comprising:

a central element disposed on the part of the chamber that lies between the two openings, an inlet cover intended to close the inlet opening, a discharge cover intended to close the discharge opening, and a locking device that, in the closed position, alternately locks each of the said covers.

In one embodiment, the locking device comprises:

a locking bar mounted so as to be free in translation on the central element parallel to the horizontal direction, each end of the said locking bar constituting a bolt able to cooperate with one of the covers in order to lock it in the closed position, and for each cover, a locking device intended to adopt a locking position in which the movement of the locking bar is prevented, and an unlocking position in which the movement of the locking bar is enabled.

In one embodiment, each locking device comprises a latch mounted so as to be free to rotate, the said latch comprising a locking lever that extends on one side of the rotation axis and an activation lever that extends on the other side of the rotation axis, and each cover comprises a stud intended to come, in the unlocking position, in abutment on the corresponding activation lever.

BRIEF DESCRIPTION OF THE DRAWINGS

The features of the disclosure mentioned above, as well as others, will emerge more clearly from a reading of the following description of an example embodiment, the said description being given in relation to the accompanying drawings, among which:

FIG. 5 is a perspective view of a covering device according to the present disclosure, FIG. 6 is a fragmented, perspective view of a portion of the covering device of FIG. 5, and FIG. 7 is a fragmented, perspective view of a portion of the covering device of FIG. 5 when another portion of the covering device is removed.

DETAILED DESCRIPTION OF THE DISCLOSURE

Figure 1:
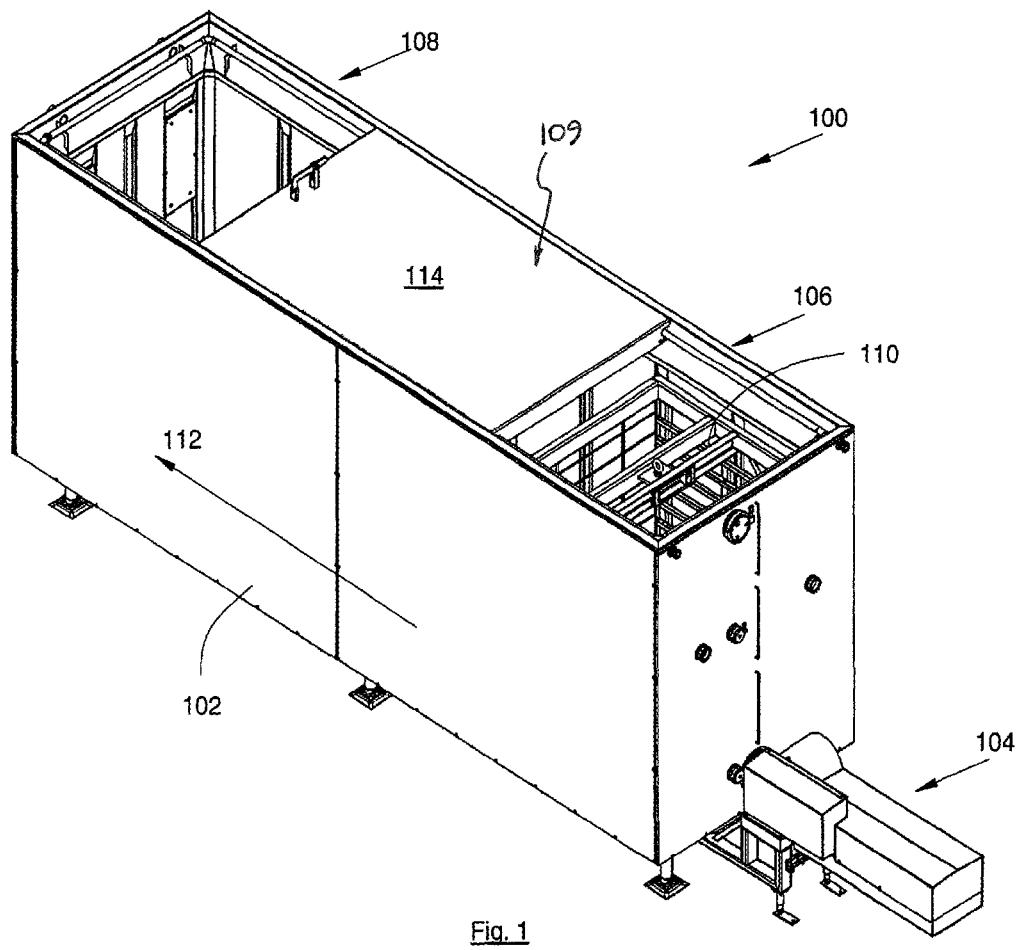
FIG. 1 is a perspective of a heat treatment vessel according to the present disclosure.

In the following description, the terms relating to a position are taken with reference to a heat treatment vessel in the operating position as shown in FIG. 1. FIG. 1 shows a heat treatment vessel 100 that comprises a chamber 102 and a movement device 104.

The chamber 102, which is here in the form of a right-angled parallelepiped, comprises an inlet opening 106 and a discharge opening 108. The two openings 106 and 108 are distinct and distant from each other. Each opening 106, 108 is disposed on the top face 109 of the chamber 102. The centre of the inlet opening 106 and the centre of the discharge opening 108 define a general direction of movement shown by the arrow 112 and which is horizontal.

In a preferred embodiment of the invention, each opening 106, 108 is closed off by a cover, which has not been shown in order to facilitate understanding of FIG. 1. Only a central covering element 114, which covers the chamber 102 while leaving the openings 106 and 108 free, is shown. The central covering element 114 covers the part of the chamber 102 that lies between the two openings 106 and 108.

A stack 110 is disposed in the chamber 102. The stack 110 can consist of any device for containing food products, such as for example alveoli, baskets, staged frames, stackable units, etc.

The chamber 102 comprises here four locations for four different stacks 110. In general terms, the number of stacks is greater than two.

Figure 2:
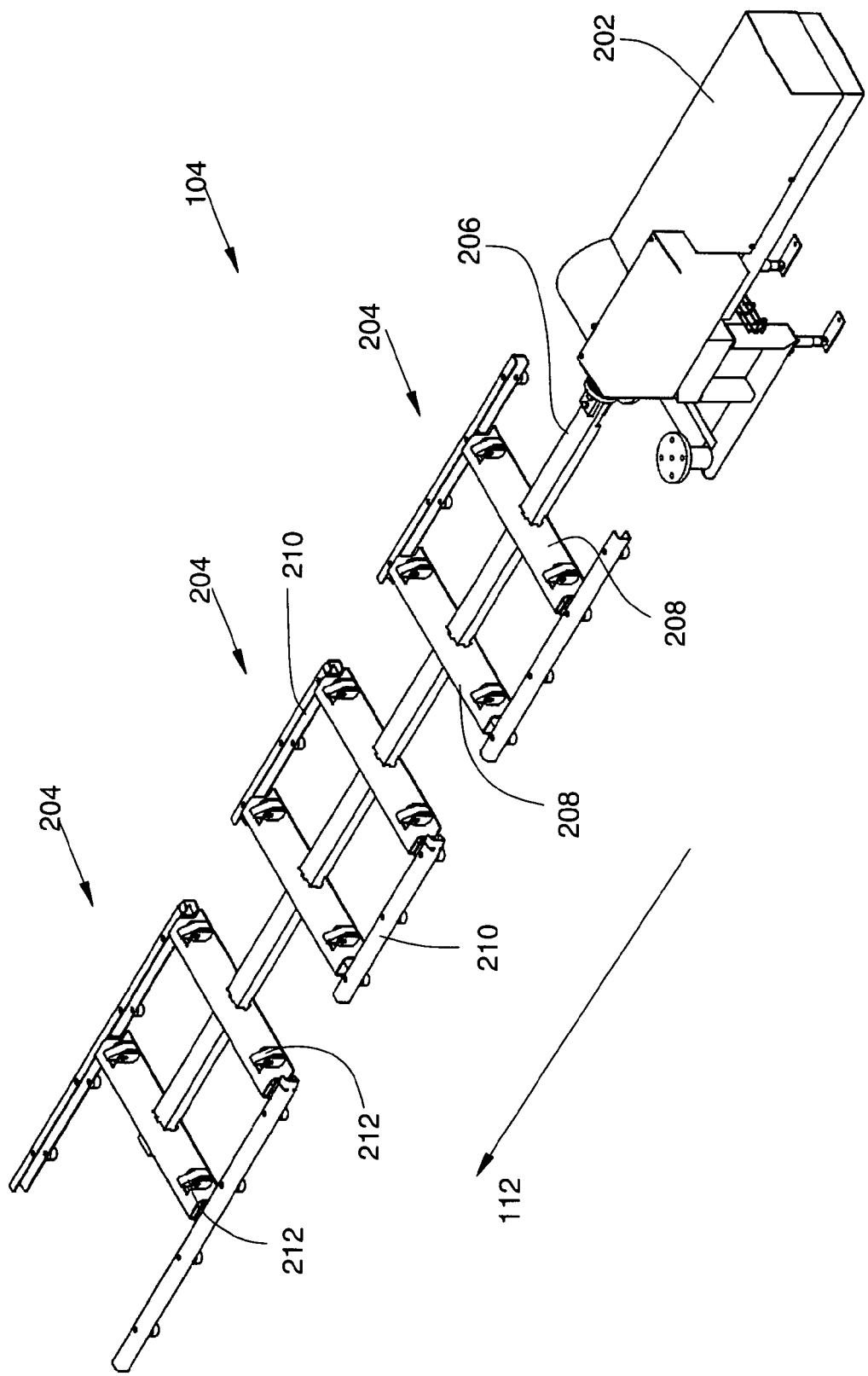
FIG. 2 is a perspective view of a movement device for a vessel according to the present disclosure.

FIG. 2 shows a particular embodiment of the movement device 104. The function of the movement device 104 is to take charge of a stack 110 at the inlet opening 106 and to transport it opposite the discharge opening 108, for the purpose of preventing a stack 110 that is to be discharged after cooking from using the inlet opening 106.

To ensure that each stack 110 entering the chamber through the inlet opening 106 necessarily leaves through the discharge opening 108, the movement device 104 can transport the stacks 110 only in one direction. The transportation of the stacks 110 from the discharge opening 108 to the inlet opening 106 must be impossible in normal operation. For this purpose, as explained below, the movement device 104 comprises driving means 212 that lock in order to successively drive each stack 110 from the inlet opening 106 to the discharge opening 108 and unlock in order to avoid driving each stack 110 from the discharge opening 108 to the inlet opening 106. Naturally it is possible to provide that, for reasons of safety, the transportation of the stacks 110 from the discharge opening 108 to the inlet opening 106 can be achieved.

The movement device 104 comprises a motorised assembly 202 that is disposed outside the chamber 102, and three carriages 204, each being intended to successively receive a stack 110, and being set in motion by the said motorised assembly 202. There is in fact one carriage 204 less that the number of locations in the chamber 102. The three carriages 204 are disposed in line parallel to the general direction of movement 112 and are secured to a beam 206 that is disposed horizontally and the end of which is driven in movement by the motorised assembly 202. The movement between the taking charge of the stack 110 and its positioning opposite the discharge opening 108 is a horizontal translation parallel to the general direction of movement 112.

Each carriage 204 here consists of two girders 208 that are horizontal and perpendicular to the beam 206. The ends of each girder 208 are mounted so as to slide in guide rails 210 that are secured to the chamber 102. By activation of the motorised assembly 202, the carriages 204 are driven in translation in a reciprocating movement parallel to the general direction of movement 112. The beam 206 passes through the chamber 102 through an orifice produced in one of the walls and, in order to ensure a seal at this orifice, an inflatable gasket is fitted. In the embodiment shown here, each girder 208 comprises two drive lugs 212 that are retractable and the functioning of which is explained below. Each lug 212 constitutes one of the driving means.

Figure 3:
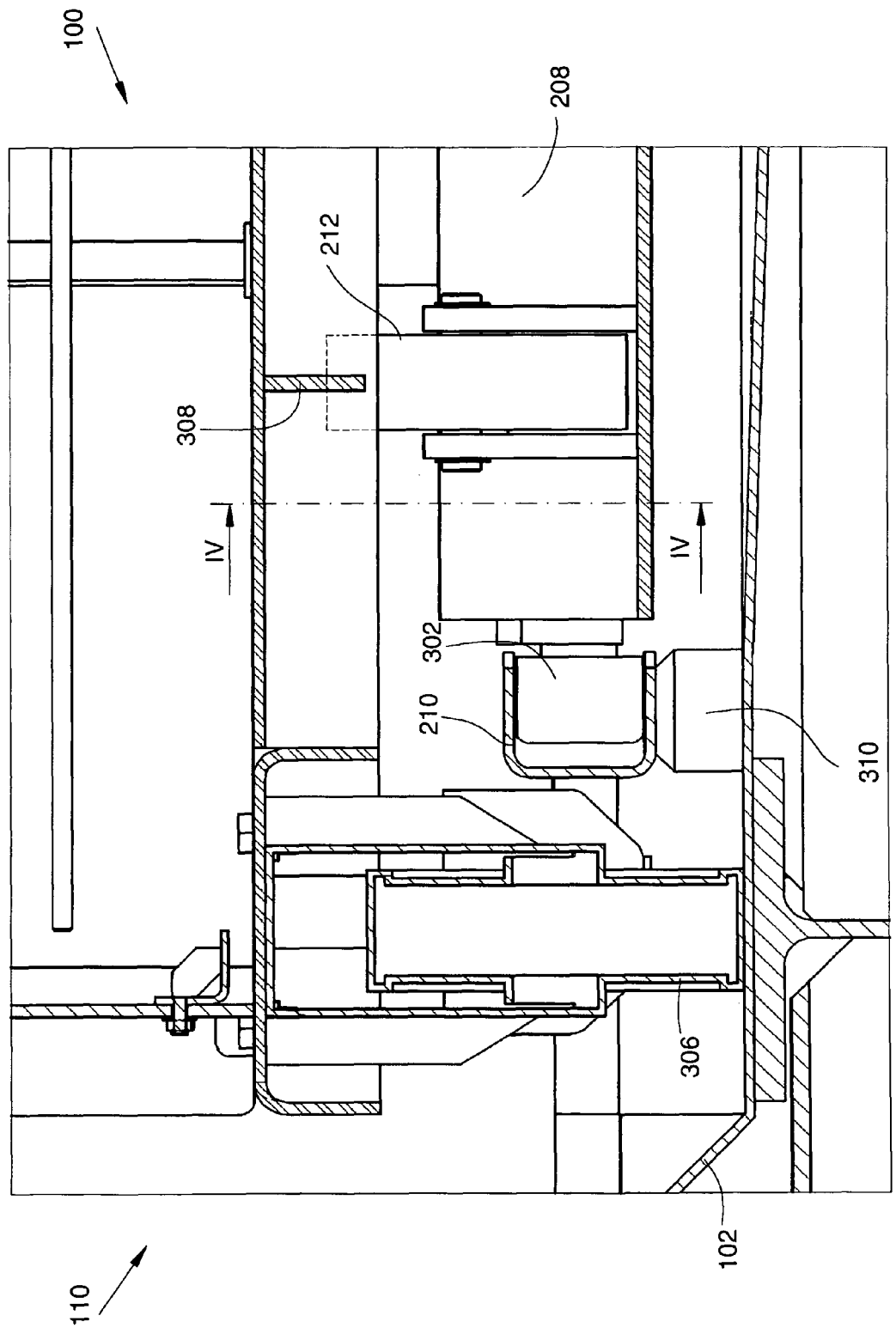
FIG. 3 is a fragmented, cross-sectional view of a vessel according to the present disclosure.

FIG. 3 is a detail of the heat treatment vessel 100. At the bottom of the chamber 102 there are disposed holding studs 310 on which the guide rails 210 are fixed. The ends of the girders 208 are provided with wheels 302 that run in the guide rails 210. Each stack 110 rests on the bottom of the chamber 102 by means of a set of wheels 306. The wheels 306 are disposed on each side of the chamber 102 so as to balance the stack 110. Under each stack 110 there is provided, facing each driving lug 212, a finger 308 that is intended to cooperate with the said driving lug 212.

Figure 4:
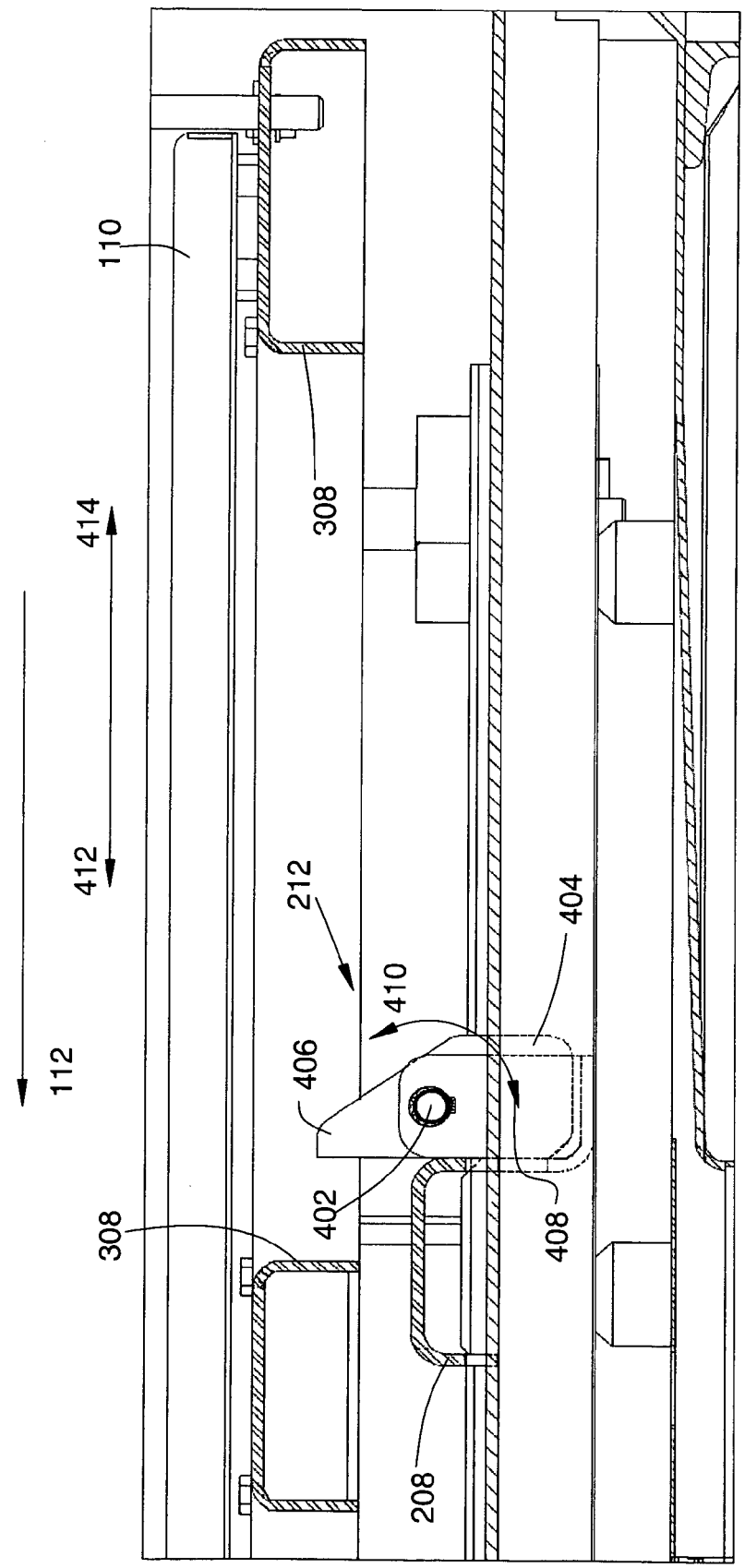
FIG. 4 is a fragmented, cross-sectional view taken along line IV-IV of FIG. 3.

FIG. 4 shows a detail of the method of cooperation between a finger 308 and a driving lug 212. The operating mode that will now be described applies in the same way to all the driving lugs 212. The driving lug 212 is mounted so as to rotate freely on the girder 208 around a shaft 402 parallel to the girder 208, that is to say horizontal and perpendicular to the general direction of movement 112. The lug 212 comprises a shoe 404 that serves as a counterweight and extends under the shaft 402 and a nose 406 that extends above the shaft 402. The shoe 402 restrains the nose 406 in this position. When the driving lug 212 is in the position shown in FIG. 4, it is locked in rotation because its shoe comes into contact with a wall of the girder 208. The driving lug 212 can therefore not turn in the clockwise direction represented by the arrow 408. On the other hand, the driving lug 212 remains free to turn in the anticlockwise direction represented by the arrow 410.

Thus, when the beam 206 moves in the direction of the arrow 412, it drives each carriage 204 and each driving lug 212 in the same direction. When the driving lugs 212 arrive in abutment against the fingers 308, the corresponding stack 110 is also driven in the same direction 412. When the beam 206 moves in the direction of the arrow 414, it drives each carriage 204 and each driving lug 212 in the same direction. When the driving lugs 212 arrive in abutment against the fingers 308, they tilt in the direction of the arrow 410 and pass under the corresponding stack 110 without driving it, and the latter then remains immobile. Thus, through a reciprocating movement of the beam 206, each stack 110 progresses in the direction of the arrow 412, that is to say from the inlet opening 106 to the discharge opening 108, and it is impossible for it to travel on the reverse path.

The motorised assembly 202 may, for example, be a rack system, which comprises a motor driving a gear that meshes on a sector fixed to the beam 206.

The method of filling the heat treatment vessel 100 is as follows. A first stack 110 is lowered through the inlet opening 106 onto the first carriage 208 situated under this inlet opening 106. The motorised assembly 202 is activated in the first direction 412 so that the driving lugs 212 of the first carriage 204 come into abutment against the fingers 308 of the first stack 110 and push it towards the discharge opening 108. When the first stack 110 has reached a first intermediate position, the motorised assembly 202 is activated in the second direction 414 so that the driving lugs 212 of the first carriage 204 pass under the fingers 308 of the first stack 110 and position themselves again under the inlet opening 106. The second carriage 204 is then situated under the first stack 110.

A second stack 110 can then be lowered through the inlet opening 106 onto the first carriage 204 situated under this inlet opening 106. The motorised assembly 202 is activated in the first direction 412 and the first carriage 204 drives the second stack 110 towards the first intermediate position, while the second carriage 204 drives the first stack 110 towards a second intermediate position. The cycle continues until the chamber 102 is filled with the appropriate number of stacks 110, that is to say until the first stack 110 is situated under the discharge opening 108 and a stack 110 is disposed at each intermediate position.

The method of filling the heat treatment vessel 100 thus comprises:

a step of admitting a first stack 110 through the inlet opening 106, a step of transportation, by the movement device 104, of each stack 110 already admitted in the direction of the position opposite the discharge opening 108, a step of admitting another stack 110 through the inlet opening 108, and a step of looping back on the transportation step as long as the first stack 110 has not reached the position opposite the discharge opening 108.

Each admission step consists of a deposition of the stack 110 vertically in line with the first carriage 204 of the movement device 104. The transportation step consists of a first movement of each carriage 204 in the direction of the position opposite the discharge opening 108 and then a second movement in the opposite direction. The removal of the stacks continues in the same way. The first stack 110 is discharged through the discharge opening 108.

The motorised assembly 202 is activated in the first direction 412 so that the driving lugs 212 of the last carriage 204 come into abutment against the fingers 308 of the second stack introduced 110 and push it under the discharge opening 108. At the same time, the other stacks 110 are driven by the other carriages 204. The reciprocating movement of the motorised assembly 202 continues until each stack 110 is situated under the discharge opening 108 and is discharged.

A heat treatment method used in a heat treatment vessel 100 according to the invention comprises:

a step of successive deposition of the stacks 110 filled with raw food products in the chamber 102 through the inlet opening 106, a step of closing the inlet 106 and discharge 108 openings, a step of filling the chamber 102 with cooking water, a step of cooking the food products, a step of draining the cooking water from the chamber 102, a step of filling the chamber 102 with cooling water, a step of cooling the food products, a step of draining the cooling water from the chamber 102, and a step of successive removal of the stacks 110 filled with cooked food products from the chamber 102 through the discharge opening 108.

The principle therefore consists of the fact that the first stack 110 admitted is the first stack 110 discharged. It also makes it possible to physically separate the area where the raw products enter the vessel and the one where the cooked and cooled products emerge from it. The movement of each stack 110 in the chamber 102 take place horizontally, which gives rise to no significant mechanical stress in the structure of the chamber 102.

FIG. 5 shows a covering device 500, comprising:

a central element 502 that comes in place of the central covering element 114 of FIG. 1, that is to say is disposed on the part of the chamber 102 that lies between the two openings 106 and 108, an inlet cover 504 intended to close the inlet opening 106, a discharge cover 506 intended to close the discharge opening 108, and a locking device 508 that, in the closed position, alternately locks each of the said covers 504 and 506, that is to say it is possible to open only one cover 504, 506 at a time.

The locking device 508 comprises, in the embodiment shown here:

a locking bar 510 mounted so as to be free to move in translation on the central element 502 parallel to the general direction of movement 112, each end of the said locking bar 510 being designed to constitute a bolt that cooperates with one of the covers 504, 506 so as to lock it in the closed position, and for each cover 504, 506, a locking device 512 adapted to adopt alternately a locking position in which the movement of the locking bar 510 is prevented, and an unlocking position in which the movement of the locking bar 510 is enabled.

The length of the locking bar 510 is such that, when one of the ends of the locking bar 510 locks one of the covers 504, 506 in the closed position, the other end of the locking bar 510 is released from the other cover 506, 504 so as to allow opening thereof. When a cover 504, 506 is in place on the corresponding opening 106, 108, the corresponding locking device 512 is in the unlocking position, while when a cover 504, 506 is not in place the corresponding locking device 512 is in the locking position. Passage from the locking position to the unlocking position takes place by putting in abutment a stud 608 that each cover 504, 506 comprises and that is intended to come to bear on the corresponding locking device 512.

In the embodiment presented here, the locking of a cover 504, 506 takes place by positioning an end of the locking bar 510 above the said cover 504, 506. The locking device 512 will more particularly be described for the discharge cover 506 but the locking device 512 of the inlet cover 504 is similar.

FIG. 6 shows the locking device 512 in the unlocking position and FIG. 7 shows the locking device 512 in the locking position. The locking device 512 comprises a latch 602 that is mounted so as to rotate freely, here about an axis parallel to the general direction of movement 112. Each locking device 512 is disposed between the central element 502 and one of the covers 504, 506 and is here secured to the central element 502. The latch 602 comprises a locking lever 604 that extends on one side of the rotation axis and an activation lever 606 that extends on the other side of the rotation axis. In the locking position (FIG. 7), the locking lever 604 is opposite the end of the locking bar 510, preventing the movement of the latter in the direction of the discharge opening 108 and the discharge cover 506. In the unlocking position (FIG. 6), the locking lever 604 is not opposite the end of the locking bar 510 allowing the movement of the latter in the direction of the discharge opening 108 and the discharge cover 506. Passage from the locking position to the unlocking position takes place by abutment of the stud 608 on the activation lever 606.

The functioning of the covering device 500 is as follows. When the two covers 504 and 506 are in place, each locking device 512 is in the unlocking position, that is to say each stud 608 bears on the activation lever 606, thus allowing free movement of the locking bar 510 above one or other of the covers 504, 506. When the locking bar 510 is moved above a cover, for example the cover 504, the other cover, in this case the cover 506, can be freely removed. Removal of the cover 506 causes the break in the abutment of the stud 608 on the activation lever 606 and consequently the lowering of the locking lever 604 opposite the end of the locking bar 510, preventing any subsequent movement of the latter and therefore the removal of the other cover 504. Replacement of the cover 506 thus removed causes the stud 608 to be put in abutment on the activation lever 606 and consequently the raising of the locking lever 604, allowing free movement of the locking bar 510.

Naturally the present disclosure is not limited to the examples and embodiments described and depicted but is capable of numerous variants accessible to persons skilled in the art.

What is claimed is:

1. A heat treatment vessel configured to receive at least two stacks of food products, comprising:
   a chamber containing a liquid for heating the food products and including a top face that forms an inlet opening and a discharge opening, the discharge opening being disposed on the top face of the chamber and separated from the inlet opening, the inlet opening and the discharge opening being disposed vertically above the liquid, at least a portion of each of the inlet opening and the discharge opening being disposed directly above the liquid;
   a movement device configured to engage a stack received through the inlet opening and to transport the stack toward the discharge opening, each stack including a device configured to contain food products; and
   a covering device including:
   a central element disposed between the inlet opening and the discharge opening;
   an inlet cover configured to close the inlet opening;
   a discharge cover configured to close the discharge opening; and
   a locking device configured to alternately lock the inlet cover and the discharge cover.

2. The vessel according to claim 1, wherein the chamber further includes a top, the inlet opening and the discharge opening being formed at the top of the chamber.

3. The vessel according to claim 1, wherein the movement device transports the stack in a horizontal translation.

4. The vessel according to claim 1, wherein the locking device includes:
   a locking bar mounted to the central element for movement in a horizontal direction and including a first end configured to cooperate with the inlet cover to lock the inlet cover in a closed position and a second end configured to cooperate with the discharge cover to lock the discharge cover in a closed position, and
   a pair of locking latches respectively associated with the inlet cover and the discharge cover, each locking latch being movable between a locking position in which the movement of the locking bar is inhibited and an unlocking position in which the movement of the locking bar is enabled.

5. The vessel according to claim 4, wherein each locking latch is mounted for rotation about an axis and includes a locking lever that extends on one side of the axis and an activation lever that extends on another side of the axis.

6. The vessel according to claim 5, wherein each cover includes a stud configured to engage the activation lever of the locking latch associated with the cover, thereby moving the locking latch into the unlocking position.

7. The vessel according to claim 1, wherein the movement device comprises:
   a motorized assembly configured to generate a reciprocating movement; and
   a plurality of carriages being movable by the motorized assembly, each carriage being configured to successively receive a stack and comprising driving means having a locked position to successively drive each stack toward the discharge opening and an unlocked position to avoid driving the stacks toward the inlet opening.

8. The vessel according to claim 7, wherein each driving means includes a lug mounted for rotation in only one direction between the locked position and the unlocked position.

9. The vessel according to claim 7, wherein the chamber further includes guide rails mounted therein configured to guide the movement of the plurality of carriages.

10. The vessel according to claim 1, wherein the device of each stack includes wheels that engage a bottom of the chamber when the stack is received by the chamber.

11. A covering device for a heat treatment vessel configured to receive at least two stacks of food products, the vessel including a chamber configured to be filled with water performing the heat treatment and having an inlet opening and a discharge opening separated from the inlet opening, both openings being disposed at a top of the chamber vertically above the water, and a movement device configured to engage a stack received though the inlet opening and to transport it in a horizontal translation toward the discharge opening, the covering device comprising:
- a central element disposed at the top of the chamber between the two openings;
- an inlet cover configured to close the inlet opening;
- a discharge cover configured to close the discharge opening;
- a locking device configured to alternately lock the covers, the locking device comprising a locking bar mounted to the central element for horizontal movement and having a first end configured to cooperate with the inlet cover to lock the inlet cover in a closed position while the discharge cover is unlocked and a second end configured to cooperate with the discharge cover to lock the discharge cover in a closed position while the inlet cover is unlocked;
- a first locking latch disposed adjacent the first end of the locking bar and being movable between a locking position to directly engage and inhibit movement of the locking bar and an unlocking position to permit movement of the locking bar; and
- a second locking latch disposed adjacent the second end of the locking bar and being movable between a locking position to directly engage and inhibit movement of the locking bar and an unlocking position to permit movement of the locking bar.

12. The covering device according to claim 11, wherein each locking latch is mounted for rotation about an axis and includes a locking lever that extends on one side of the axis and an activation lever that extends on another side of the axis, each cover including a stud configured to engage one of the activation levers to move the corresponding locking latch to the unlocking position.

* * * * *